United States Patent [19]

Meier, Jr.

[11] Patent Number: 5,125,709
[45] Date of Patent: Jun. 30, 1992

[54] ROBOTIC GRIPPER ASSEMBLY

[75] Inventor: Raymond C. Meier, Jr., Canton, Mich.

[73] Assignee: Ford Motor Company, Dearborn, Mich.

[21] Appl. No.: 734,004

[22] Filed: Jul. 22, 1991

[51] Int. Cl.$^5$ ............................................. B25J 15/00
[52] U.S. Cl. .................... 294/119.1; 294/86.4
[58] Field of Search ............... 294/119.1, 93, 86.4; 901/39

[56] References Cited

U.S. PATENT DOCUMENTS

| | | |
|---|---|---|
| 3,302,968 | 2/1967 | Bleiman et al. |
| 3,992,049 | 11/1976 | Milholen et al. |
| 4,484,855 | 11/1984 | Inaba et al. |
| 4,598,942 | 7/1986 | Shum et al. |
| 4,765,669 | 8/1988 | Meier . |
| 4,813,732 | 3/1989 | Klem . |
| 4,955,653 | 9/1990 | Beals .......................... 294/119.1 |

FOREIGN PATENT DOCUMENTS 53-18165  7/1978  Japan .

Primary Examiner—Margaret A. Focarino
Assistant Examiner—Joseph D. Pape
Attorney, Agent, or Firm—Raymond L. Coppiellie; Clifford L. Sadler

[57] ABSTRACT

A robotic gripper apparatus having a pair of finger support assemblies associated with a slot and a slotted disk provides longitudinal movement when the slotted disk is rotated. The apparatus includes a mechanism for varying the circumferential position of the finger support assemblies around the circumference of the apparatus about an axis perpendicular to the plane of the slotted disk.

15 Claims, 3 Drawing Sheets

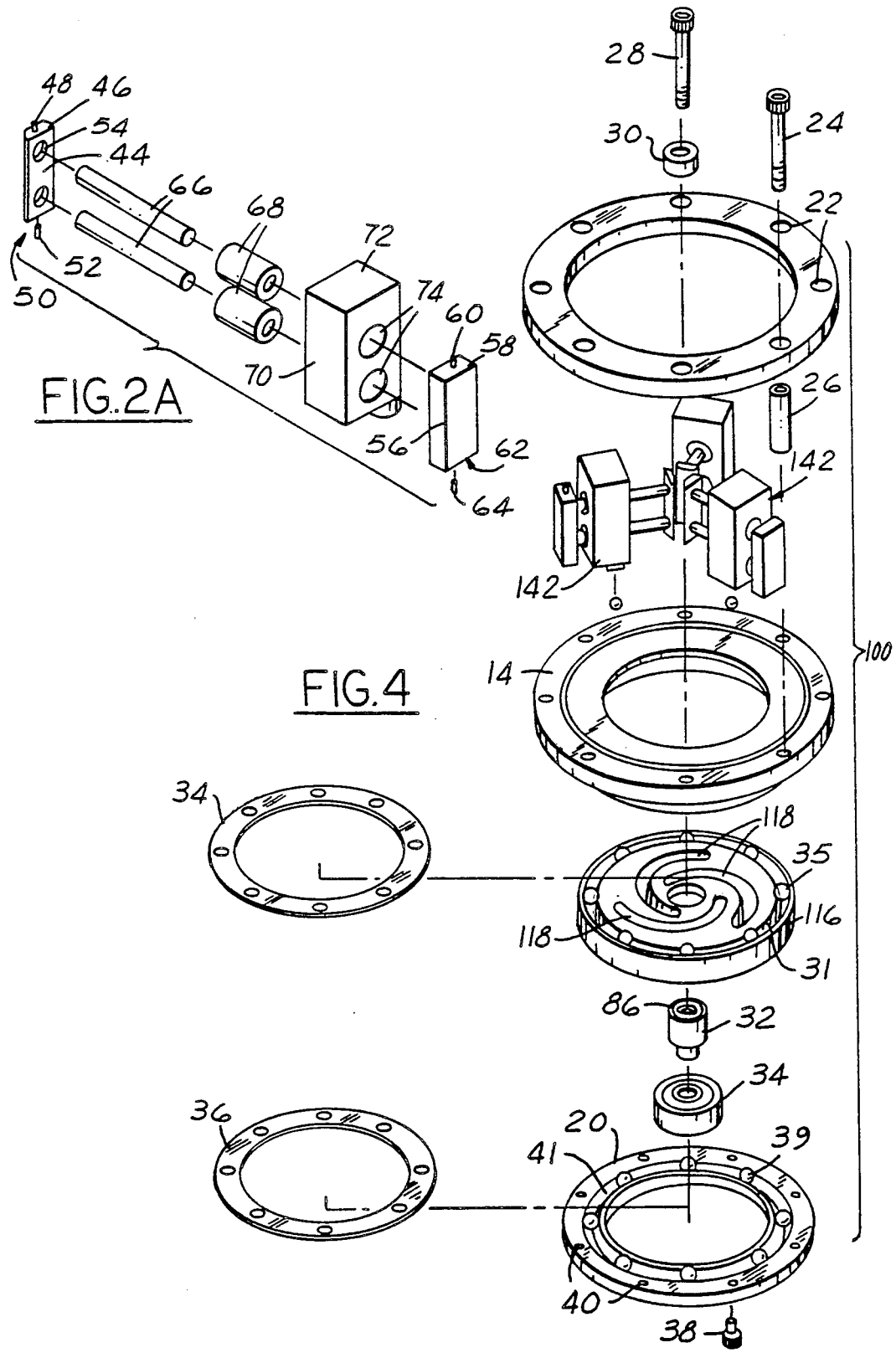

ROBOTIC GRIPPER ASSEMBLY

BACKGROUND OF THE INVENTION

1. Field of the Invention

The present invention relates generally to robotic gripper assemblies. More particularly, the present invention relates to a robotic gripper assembly which includes finger mounting receptacles which can be positioned at a plurality of radial positions.

2. Disclosure Information

Robotic gripper assemblies are known having finger pairs coupled to rotatable gears for moving the fingers toward and away from each other such as disclosed in U.S. Pat. No. 4,598,942. Typically, the rotatable movement of these fingers may not be suitable for a wide variety of objects having different shapes. My U.S. Pat. No. 4,765,669, assigned to the assignee of the present invention, discloses an adaptable robotic gripper assembly which utilizes a slotted disk and cam arrangement to affect linear motion of a pair of mechanical robotic fingers through rotational movement of the slotted disk and cam arrangement. However, in order to change the circumferential position of the mechanical fingers of the '669 patent, it is necessary to remove the whole assembly from the end effector to which it is attached and rotate the entire assembly relative to the end effector. Removing the entire gripper assembly from the end effector can be a time consuming endeavor.

Other known robotic grippers have two fingers which move linearly in a single plane such as is disclosed in Japanese Patent No. 53-18165. As with the gripper assembly of the '669 patent, in order to change the circumferential position or the mechanical orientation of the finger assemblies of the Japanese disclosure, it is necessary to remove the entire gripper assembly from the end effector and rotate the gripper assembly relative to the end effector. Therefore, there is a need to provide a gripper assembly wherein the circumferential position of the mechanical fingers of the gripper mechanisms can be varied without the need for removing the entire gripper assembly from its end effector.

It is an object of the present invention to provide a robotic gripper assembly wherein the mechanical fingers of the assembly can be positioned in a variety of positions around the circumference of the assembly.

It is a feature of the present invention to provide a robotic gripper assembly capable of handling a wider variety of shapes than heretofore possible. These objects and other objects, features and advantages of the present invention will become apparent from the summary, detailed description, and claims which follow.

SUMMARY OF THE INVENTION

In one aspect of the present invention, the problems described above are solved by an apparatus for mechanically gripping an object comprising: a generally circular slotted disk having a cam slot formed therein and adapted to be rotated with respect to a support structure about an axis generally perpendicular to the plane of the disk. The support structure comprises an annular disk positioned in a plane generally parallel to the plane of the slotted disk and a generally circular base member positioned in a plane generally parallel to and spaced apart from the annular disk. The apparatus further comprises at least one finger support assembly supported on the support structure and having means engaging the slotted disk. The finger support assembly comprises an inner support member, an outer support member, a pair of support shafts disposed generally parallel to the plane of the slotted disk and extending between the inner and outer support members, and a finger mounting block mounted about the pair of support shafts for a reciprocal linear movement along the shafts.

The apparatus further comprises guide means for adjustably supporting the finger support assembly at various circumferential positions relative the support structure about an axis perpendicular to the plane of the slotted disk, whereby the gripping fingers supported on the assembly may be properly aligned with the workpiece or object to be manipulated by the robot.

In one embodiment of the present invention, the guide means comprises a first circumferential slot disposed on a bottom surface of the annular disk and a second circumferential slot disposed on the top surface of the base member in opposing relation to the slot of the annular disk. The guide means further includes a pair of pins disposed on the outer support members, each one of the pair of pins being located on opposing sides of the support member and being journaled in a respective slot of the annular disk and the base member for sliding movement therein. Thus, the guide means is constructed to permit the finger support assembly to be moved to a plurality of positions around the circumference of the apparatus about an axis perpendicular to the plane of the slotted disk.

BRIEF DESCRIPTION OF THE DRAWINGS

FIG. 2A is an exploded view of a finger support assembly of an apparatus of the present invention.

FIG. 4 is an exploded view of an alternative embodiment of an apparatus structured in accord with the principles of the present invention.

DETAILED DESCRIPTION OF THE PREFERRED EMBODIMENT

Figure 1:
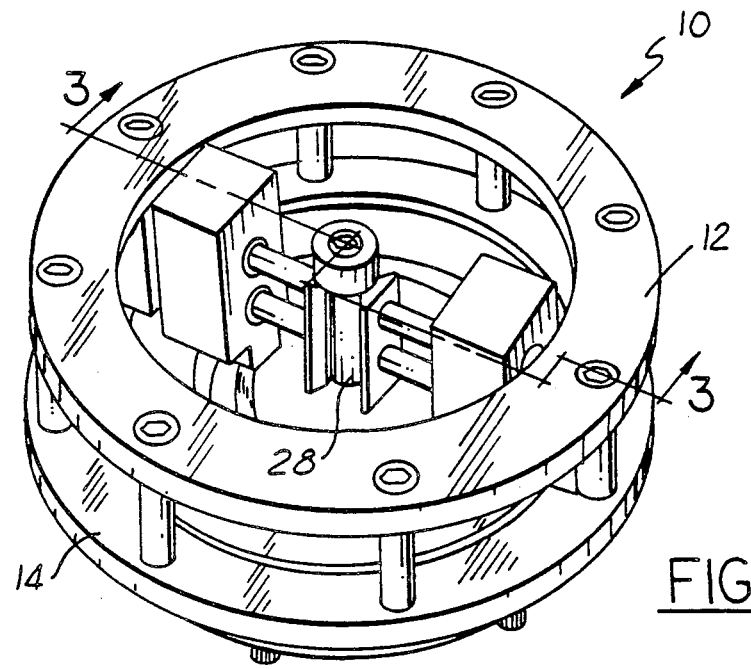
FIG. 1 is a perspective view of an apparatus structured in accord with the principles of the present invention.
Figure 3:
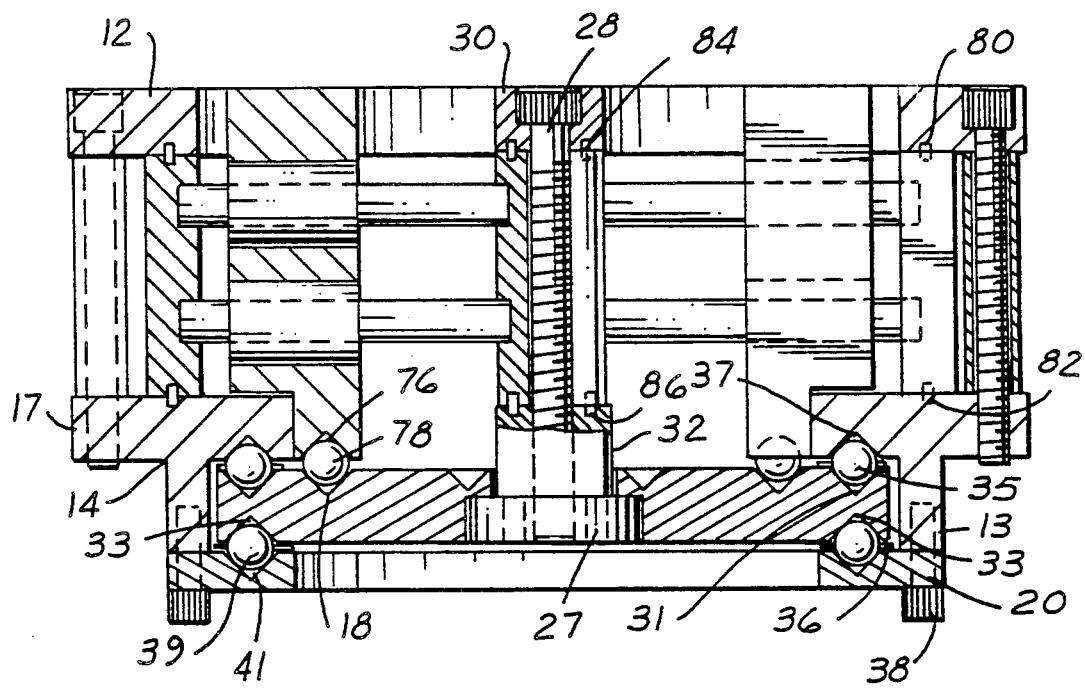
FIG. 3 is a cross-sectional view taken along line 3—3 of FIG. 1.
Figure 2:
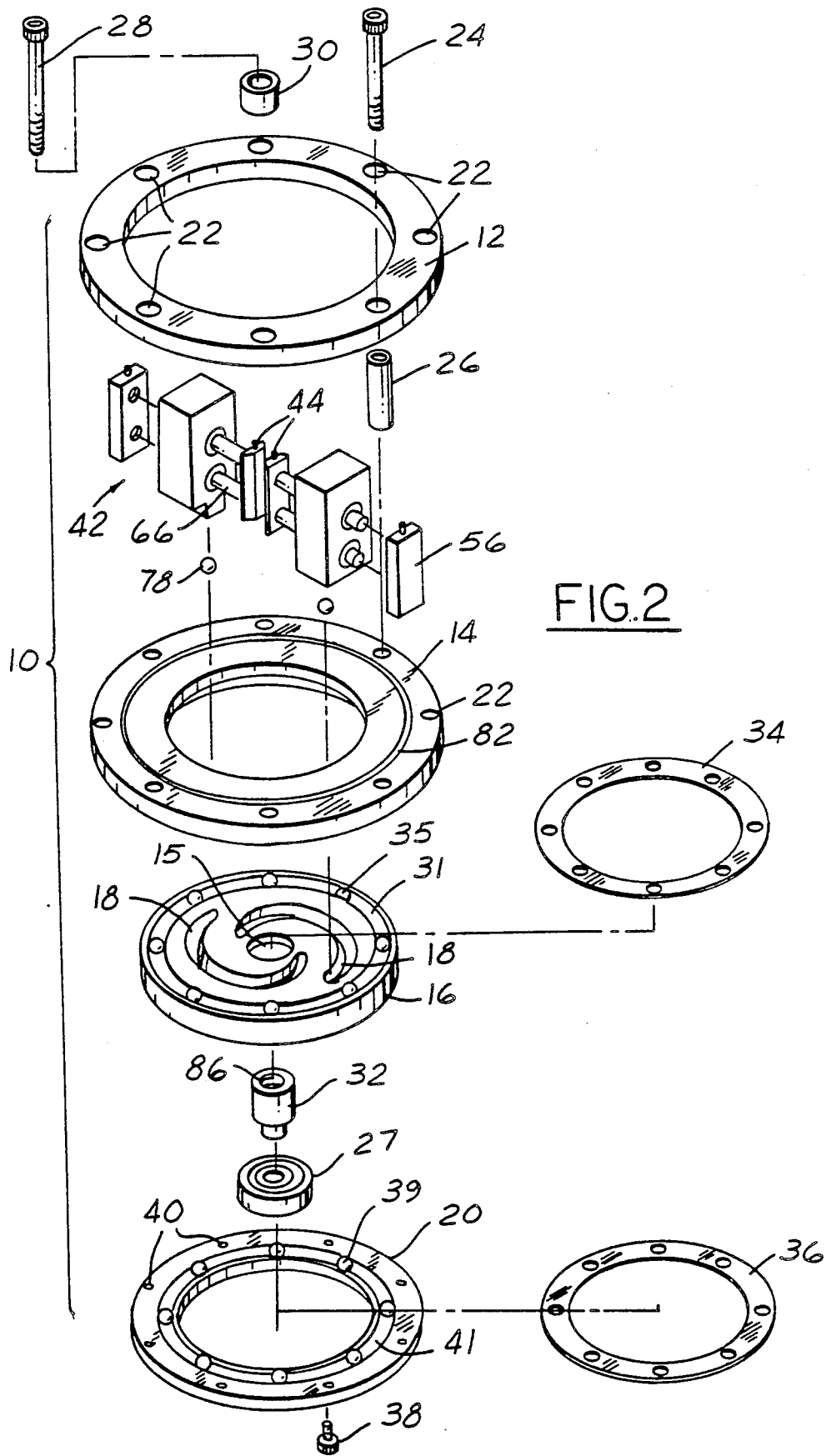
FIG. 2 is an exploded view of the apparatus of FIG. 1.

Referring now to FIGS. 1-3, a robotic gripper apparatus 10 of the present invention includes a generally circular top cover 12, a circular base 14 and a generally circular slotted disk 16. The top cover and base comprise the major parts of a housing assembly that rotatably supports the disk 16. The top cover 12 is configured as an annular disk and is positioned in a plane parallel to the plane of the slotted disk 16 above the base 14 and disk 16. The base 14 also is configured as a disk having an annular portion 17 and including a depending wall 13 projecting perpendicularly therefrom. The slotted disk 16 is position below the annular portion 17 of the base and adjacent the depending wall 13 as can best be seen in FIG. 3. The top cover 12, the base 14 and the slotted disk 16 are positioned in a substantially linear arrangement. A plurality of threaded fasteners 24 project through apertures 22 located in the top cover 12 and the base 14 to fix the top cover 12 to the base 14. A spacer 26 surrounds each of the threaded fasteners 24 and separates the top cover 12 from the base 14 by a predetermined distance.

A third annular disk, the bottom cover 20, is also disposed in a plane parallel to the plane of the slotted disk 16 subjacent the disk 16. A plurality of fasteners 38 project through apertures 40 in the bottom cover to secure the bottom cover to the depending wall 13 of the base 14 and secured the slotted disk 16 between the base 14 and the bottom cover 20. The top cover 12, base 14, slotted disk 16, and bottom cover may be manufactured from variety of known materials such as aluminum alloys and steel alloys. The present invention is not meant to be limited to a specific metal.

The slotted disk 16 includes a pair of slots 18 which provide the linear motion of a robotic finger mechanism when the disk 16 is rotated as will be described below and as is described in U.S. Pat. No. 4,765,669, the disclosure of which is herein incorporated by reference. The slotted disk also includes a pair of bearing races 31, 33 extending circumferentially on opposing faces of the disk. A plurality of roller bearings 35 are interposed between race 31 of the slotted disk 16 and a race 37 extending circumferentially on a bottom surface of the annular portion 17 of base 14. An intermediate ring, or bearing cage 34 is disposed over roller bearings 35 to space the bearings in a predetermined relationship around the circumference of the disk 16. Similarly, a plurality of roller bearings 39 are interposed between the race 33 of slotted disk 16 and a race 41 circumferentially extending around the bottom cover 20. A second bearing cage 36 is disposed over the bearings 39 to space the bearings in a predetermined relationship. It should be readily apparent to one skilled in the art that the roller bearings 35 and 39 provide means for allowing the slotted disk to rotate relative to the base 14 and the bottom cover 20. Other known bearing assemblies could be utilized just as effectively to provide for relative rotation of the disk 16.

The robotic gripper apparatus 10 of the present invention further includes a threaded fastener 28 projecting radially through the center of the top cover 12, the base 14, and an aperture 15 in the slotted disk 16 and is secured into a bearing assembly 27. The fastener 28 is surrounded by an upper collar 30 and a lower collar 32. The bearing assembly 27 is press fit onto the lower collar 32 and fastener 28 is threaded into collar 32. The bearing assembly is then press fit into the slotted disk 16 in such a manner that a clearance exists between the aperture 15 and the lower collar 32 to the lower collar 32 are separated relative to one another by a predetermined distance substantially equal to the length of a finger support assembly 42 which will be described below.

As shown in FIGS. 1-3, the apparatus 10 of the present invention includes a pair of finger support assemblies 42. The finger support assemblies 42 are configured to receive mechanical robotic fingers having a configuration dependent upon what type of object the robot will grip. As best shown in FIG. 2A, each finger support assembly 42 includes an inner support member 44, having a top surface 46 with a pin 48 projecting therefrom and a bottom surface 50 having a pin 52 projecting therefrom. The inner support member 44 further includes a pair of apertures 54 for receiving the ends of a pair of support shafts 66. Each inner support member 44 is positioned adjacent the threaded fastener 28 and is interposed between the upper collar 30 and lower collar 32.

Each finger support assembly 42 further includes an outer support member 56 having a top surface 58 and a bottom surface 62. The outer support members include a pair of pins 60, 64, projecting from the top and bottom surfaces 58, 62, respectively. The outer support member 56 also includes a pair of apertures (not shown) for receiving the opposite ends of the support shafts 66 therein. Each outer support member is positioned between the top cover 12 and the base 14.

A pair of support shafts 66 connect the inner support members 44 to the outer support members 56. A finger mounting block 70 is mounted about the pair of shafts 66 which project through a pair of aperture 74 in the mounting block 70. A pair of linear roller bearings 68 are press fit into the apertures 74 of the block 70 to permit linear movement of the mounting block along the support shafts 66. The mounting block 70 includes a top surface 72 upon which a mechanical robotic finger is mounted to grip a work piece. The finger mounting blocks 70 are aligned in a plane generally perpendicular to the plane of the slotted disk and can be seen in FIG. 3, the mounting blocks 70 each include a slot 76 disposed on a bottom surface thereof. A roller bearing 78 interposed between the slot 76 and the slots 18 of the slotted disk 16 provide rotational motion of the slotted disk 16 under a mechanical influence, such as an electric stepper motor, to cause linear motion of the finger mounting blocks 42 along the support shafts 66 to grip a workpiece or object. In this manner, the finger mounting blocks 42 do not bind relative to the slotted disk 16 as in prior art arrangements. It should be apparent to one of ordinary skill in the art that a single shaft or more than two shafts could be substituted for the support shafts 66 of the present invention.

The robotic gripper apparatus 10 further includes guide means for adjustably supporting the finger support assemblies at various circumferential positions relative the top cover 12 and base 14 about an axis perpendicular to the plane of the slotted disk 16. As shown in FIG. 3, the top cover 12 includes a circumferential slot 80 into which the top pin 60 of the outer support member 56 projects. The base 14 includes a circumferential slot 82 which receives the bottom pin 64 of the outer support member 56. The upper collar 30 surrounding the threaded fastener 28 includes a slot 84 disposed on a bottom surface thereof which receives the top pin 48 of the inner support member 44 therein. Similarly, the lower collar 32 includes a circumferential slot 86 which receives the bottom pin 52 of the inner support member. The slot 86 on the lower collar is disposed on the face of the collar in opposing relation to the slot disposed on the bottom surface of the upper collar. When the threaded fasteners 24 and 28 are loosened, each finger support assembly 42 may be circumferentially positioned around the circumference of the base 14 and top cover 12 by simply sliding the finger support assemblies 42 in the slots contained in the top cover 12 and the base 14. In this manner, the finger support assemblies may be placed in any position 360 degrees around the circumference of the apparatus 10. When a desired position is achieved, the threaded fasteners 24 and 28 are tightened to fix the position of the finger support assemblies.

FIG. 4 shows an alternative robotic gripper apparatus 100 constructed in accordance with the assembly shown generally in FIGS. 1-3 but to provide for a 3-finger support assembly. More specifically, slotted disk 16 is shown having three positioning slots 118 which receive three finger support assemblies 142 therein. In this configuration, each of the finger support assemblies is adapted to receive a gripping finger thereon. In operation, rotational movement of slotted disk 116 effects radial movement of finger support assemblies 142 along the support shafts. Each of the gripper fingers (not shown) moves through a separate and intersecting plane perpendicular to the plane of the slotted disk 116. The multiple plane movement of the fingers enables the handling of a large variety of irregularly-shaped objects.

From the foregoing, it is readily apparent that by loosening threaded fasteners 24 and 28, a variety of mechanical orientations of the finger assemblies can readily be obtained by simply sliding the finger support assemblies to different circumferential positions around the circumference of the base 14. Furthermore, as described in the '669 patent, a stepper motor can be attached to the base 14 to cause rotation of the slotted disk. A clockwise rotation causes the robotic fingers to grip or to go to a fully closed position while a counterclockwise rotation causes the fingers to release or to go to fully open position.

It should be readily apparent to those skilled in the art that many variations and permutations of the present invention are possible. For example, a variety of slotted disks having different slot configurations thereon may be utilized such as are disclosed in U.S. Pat. No. 4,765,669. For example, a slotted disk 16 having one continuous spiral slot may be utilized in the present invention to provide for even more unique finger gripping arrangements. It is possible with a continuous spiral slot to provide for a phase shift between the finger support assemblies by simply moving the roller bearing 78 disposed between the finger mounting block and the slot to a different ring on the continuous spiral. The present invention may also be used with the cam and slotted disk arrangements described in the '669 patent to vary the circumferential position of the gripper fingers about the circumference of the gripper apparatus about an axis perpendicular to the plane of the slotted disk. It is the following claims, including all equivalents, which define the scope of my invention.

What is claimed is:

1. An apparatus for mechanically gripping an object, comprising:
   a support structure;
   a generally circular slotted disk having a slot formed therein, said disk being adapted to be rotated relative to said support structure about an axis generally perpendicular to the plane of said disk;
   at least one finger support assembly supported on said support structure and having means engaging said slotted disk; and
   guide means for adjustably supporting said at least one finger support assembly at various circumferential positions relative to said support structure about an axis perpendicular to the plane of said slotted disk.

2. An apparatus according to claim 1, wherein said at least one finger support assembly comprises an inner support member, an outer support member, a pair of support shafts disposed generally parallel to the plane of said slotted disk and extending between said inner and outer support members, and a finger mounting block mounted about said pair of support shafts and being adapted to reciprocate linearly there along.

3. An apparatus according to claim 1, further including fastening means disposed generally perpendicularly to the plane of s id slotted disk and positioned centrally through said slotted disk and said support structure.

4. An apparatus according to claim 2, wherein said support structure comprises:
   an annular disk positioned in a plane generally parallel to the plane of said slotted disk; and
   a generally circular base member positioned in a plane generally parallel to and spaced apart from said annular disk.

5. An apparatus according to claim 4, wherein said guide means comprises a first slot circumferentially disposed on a bottom surface of said annular disk and a second slot circumferentially disposed on a top surface of said base member in opposing relation to said slot of said annular disk.

6. An apparatus according to claim 5, wherein said guide means further comprises a pair of pins disposed on said outer support member, each one of said pair of pins being located on opposing sides of said outer support member and being journaled in a respective slot of said annular disk and said base member for sliding movement therein.

7. An apparatus according to claim 6, wherein said guide means further includes an upper cylindrical collar having a slot disposed on a bottom surface thereof and a lower cylindrical collar having a slot disposed on an upper surface thereof, each collar surrounding said fastening means and separated a predetermined distance with respect to one another.

8. An apparatus according to claim 7, wherein said guide means further comprises a top pin disposed on a top surface of said inner support member and adapted to engage said slot of said upper collar and a bottom pin disposed on a bottom surface of said inner support member and adapted to engage said slot of said lower collar.

9. An apparatus according to claim 8, further including bearing means operatively associated with said slotted disk for providing rotation of said slotted disk relative to said fastening means.

10. An apparatus according to claim 4, wherein said support structure further includes a third plate generally parallel to said slotted disk and disposed subjacent thereto, said third plate including bearing means for permitting said slotted disk to rotate relative thereto.

11. An apparatus according to claim 10, further including a plurality of fasteners circumferentially disposed around said base member and securing said annular disk and said base member so that upon loosening said fasteners, said finger support assembly can be moved circumferentially of said base member and upon tightening said fasteners, the position of said finger support assembly is fixed.

12. An apparatus according to claim 1, further including a second finger support assembly.

13. An apparatus according to claim 2, further including a roller bearing interposed between said finger mounting block and said slot of said slotted disk.

14. An apparatus for mechanically gripping an object, comprising:
   a generally circular slotted disk having a slot formed therein and adapted to be rotated about an axis generally perpendicular to the plane of said disk;
   an annular disk positioned in a plane generally parallel to and adjacent the plane of said slotted disk, said disk having a circumferential slot disposed on a bottom surface thereof;
   a generally circular base member positioned in a plane generally parallel to the plane of said slotted disk, said plate having a circumferential slot disposed on a top surface thereof in opposing relationship to said slot of said annular disk;

an upper cylindrical collar having a circumferential slot disposed on a bottom surface thereof and a lower cylindrical collar having a circumferential slot disposed on an upper surface thereof, each collar surrounding a threaded fastener perpendicular to the axis of said slotted disk and projecting centrally through said disk;

a pair of finger support assemblies supported between said annular disk and said base member and having means engaging said slotted disk, each one of said pair of finger support assemblies comprising:

an inner support member having a top pin disposed on a top surface thereof and adapted to engage said slot of said upper collar and a bottom pin disposed on a bottom surface thereof and adapted to engage said slot of said lower collar;

an outer support member having a top pin disposed on a top surface thereof and adapted to engage said slot of said annular disk and a bottom pin disposed on a bottom surface thereof and adapted to engage said slot of said base member; and a pair of support shafts disposed generally parallel to the plane of said slotted disk and extending between said inner and outer support members; and a finger mounting block mounted about said pair of support shafts for receiving a mechanical finger thereon and being adapted to reciprocate linearly therealong;

whereby, the circumferential position of said pair of finger support assemblies can be varied around the circumference of said annular disk and said base member about an axis perpendicular to the plane of said slotted disk.

15. An apparatus according to claim 14, further including a third finger support assembly.

* * * * *